US012641476B2

(12) United States Patent
Hamrick, Jr. et al.

(10) Patent No.: US 12,641,476 B2
(45) Date of Patent: May 26, 2026

(54) PERFORMANCE OPTIMIZATION FOR QUALITY-OF-SERVICE FLOWS IN 5G NETWORK SLICES

(71) Applicant: Oracle International Corporation, Redwood City, CA (US)

(72) Inventors: Vincent A. Hamrick, Jr., Cary, NC (US); Srinivas R. Kadaba, Fremont, CA (US)

(73) Assignee: Oracle International Corporation, Redwood City, CA (US)

( * ) Notice: Subject to any disclaimer, the term of this patent is extended or adjusted under 35 U.S.C. 154(b) by 288 days.

(21) Appl. No.: 18/447,972

(22) Filed: Aug. 10, 2023

(65) Prior Publication Data

US 2025/0056302 A1      Feb. 13, 2025

(51) Int. Cl.
*H04W 28/00*       (2009.01)
*H04W 24/02*       (2009.01)
*H04W 28/02*       (2009.01)
*H04W 28/24*       (2009.01)

(52) U.S. Cl.
CPC ....... *H04W 28/0268* (2013.01); *H04W 24/02* (2013.01); *H04W 28/24* (2013.01)

(58) Field of Classification Search
CPC .............................. H04W 24/02; H04W 28/24
See application file for complete search history.

(56) References Cited

U.S. PATENT DOCUMENTS

| | | |
|---|---|---|
| 2020/0154292 A1 | 5/2020 | Bor-Yaliniz et al. |
| 2022/0278906 A1 | 9/2022 | Akman et al. |
| 2025/0024341 A1* | 1/2025 | Malik ................. H04W 36/142 |

FOREIGN PATENT DOCUMENTS

| | | | | |
|---|---|---|---|---|
| CN | 109600262 A | * | 4/2019 | ............. H04L 67/51 |
| CN | 112203330 B | * | 7/2023 | ............. H04W 28/24 |

OTHER PUBLICATIONS

International Search Report and Written Opinion for PCT/US2024/041731, mailed Oct. 25, 2024, Authorized Officer: Sonia Camba, 15 pages.
3rd Generation Partnership Project; Technical Specification Group Services and System Aspects; System architecture for the 5G System (5GS); Stage 2 (Release 17) 3GPP TS 23.501 V17.8.0, Mar. 2023 (572 pages).

* cited by examiner

*Primary Examiner* — Erika A Washington

(57)      ABSTRACT

The technology disclosed herein enables optimization of the performance of QoS flows in a network slice of a fifth-generation (5G) network. In a particular example, a method includes creating the network slices in the 5G network. The network slices comprise logically separated networks running on the 5G network. The method further includes retrieving network information indicative of whether a service level is being met for a Quality-of-Service (QOS) flow of a slice of the network slices and determining the service level for the QoS flow is not being met based on the network information. In response to determining the service level for the QoS flow is not being met, the method includes directing network control functions of the 5G network to reconfigure resource usage for the slice to achieve the service level for the QoS flow.

20 Claims, 9 Drawing Sheets

300

300

CREATE NETWORK SLICES 111-113 IN 5G NETWORK 100     301

RETRIEVE NETWORK INFORMATION INDICATIVE OF WHETHER A SERVICE LEVEL IS BEING MET FOR QoS FLOW 133     302

SERVICE LEVEL BEING MET?     303

YES

NO

RECONFIGURE RESOURCE USAGE FOR SLICE 113 TO MEET THE SERVICE LEVEL     304

600

IDENTIFY NEW UE, SESSION, OR FLOW REQUEST    601

CAPACITY AVAILABLE?    602

NO

YES

DETERMINE SESSION PATH    603

CAN PATH ACCOMMODATE?    604

NO

YES

ACCEPT REQUEST AND PROVIDE PATH INSTRUCTIONS    605

REJECT REQUEST    606

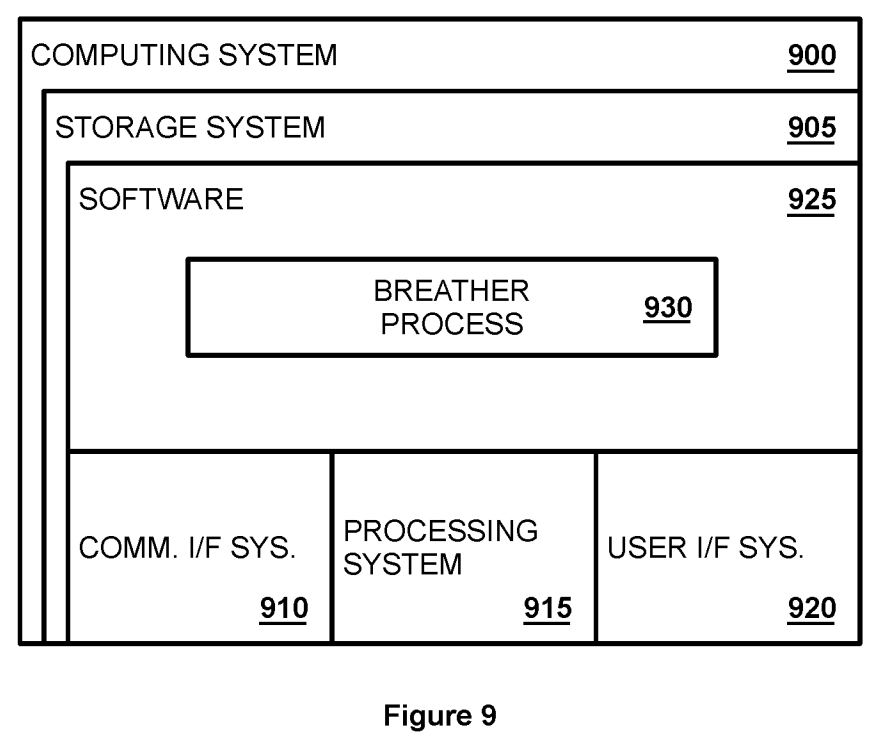

COMPUTING SYSTEM 900

STORAGE SYSTEM 905

SOFTWARE 925

BREATHER PROCESS 930

COMM. I/F SYS. 910

PROCESSING SYSTEM 915

USER I/F SYS. 920

Figure 9

PERFORMANCE OPTIMIZATION FOR QUALITY-OF-SERVICE FLOWS IN 5G NETWORK SLICES

BACKGROUND

The architecture of fifth-generation (5G) wireless networks allows for the creation of network slices. A network slice is a partition of the 5G network into virtualized subnetworks. Each subnetwork may address specific business needs and/or service level agreements (SLAs). With network slicing, Communications Service Providers (CSPs) are now able to offer slices for specific purposes, such as enhanced mobile broadband, Internet of Things, public services, and enterprise needs. The traffic for each specific purpose can, therefore, be separated through the use of different network slices for that traffic.

Each network slice serves a set of one or more items of user equipment (UEs), which are the systems/devices that connect to the 5G network. The UEs are served with one or more associated protocol data unit (PDU) sessions that connect to different data networks that may serve applications such as Internet, voice service, gaming, etc. In turn, each PDU session can carry one or more Quality-of-Service (QOS) flows. A QoS flow is a unit of communication that carries bearer traffic between an application on the UE and a corresponding application in a data network. As such, a QoS flow is associated with service requirements such data throughput, application or packet latency, admission success rate, and session drop rate, and those requirements should be met across all flows.

SUMMARY

The technology disclosed herein enables optimization of the performance of QoS flows in a network slice of a fifth-generation (5G) network. In a particular example, a method includes creating the network slices in the 5G network. The network slices comprise logically separated networks running on the 5G network. The method further includes retrieving network information indicative of whether a service level is being met for a Quality-of-Service (QOS) flow of a slice of the network slices and determining the service level for the QoS flow is not being met based on the network information. In response to determining the service level for the QoS flow is not being met, the method includes directing network control functions of the 5G network to reconfigure resource usage for the slice to achieve the service level for the QoS flow.

In other examples, an apparatus performs the above-recited method and program instructions stored on computer readable storage media direct a processing system to perform the above-recited method.

BRIEF DESCRIPTION OF THE DRAWINGS

FIG. 9 illustrates a computing system for optimizing QoS flows in network slices of a 5G network.

DETAILED DESCRIPTION

The 5G networks described below employ a mechanism referred to herein as slice breathing to ensure service requirements of QoS flows are being met. To track, control, and optimize the performance metrics of a slice or slices as a whole, as well as the individual QoS flows within, the networks consider different aspects of the network when determining whether to take action. One aspect is admission control. When a new request is made for access to a slice by a UE, or a request is made to set up a new PDU session or QoS flow, the network determines whether the slice can handle the new request while maintaining service requirements of the existing sessions/flows. A second aspect under consideration is session path (re) placement. As per access procedures specified in 3GPP TS 23.502 [3], when a UE is admitted to the slice, the path for the QoS flow is also assigned. A path is defined by a set including the "initial" or "intermediate" user plane function (UPF) (also known as PDU Session Anchor or PA in 3GPP terminology), the serving gNodeB, and a radio band on the gNodeB on which UEs in the slice are attached. At a later stage, due to dynamically changing conditions, it may be appropriate to migrate the UE to a different path within the same slice. For instance, it may be beneficial to move the UE to a different radio band or move the data session to a different UPF. Such a migration can be treated as admission control to the target path.

A third aspect is session control, which determines how ongoing sessions may be manipulated (via some combination of queuing, scheduling, and rate control) so that the probability of service level requirements (e.g., those defined by SLAs) being violated is reduced. Path analysis and control is another aspect considered. Path analysis and control may be an ongoing process to track the load on each path and the aggregated performance metrics of the path. If the situation allows, the resources allocated to the paths may be adjusted to ensure that service level requirements are met. Similarly, slice resource control is another aspect. When needed, it may be necessary to rebalance the resources allocated to slices (e.g., radio and IP network bandwidth) to ensure satisfactory service to all slices.

Figure 1:
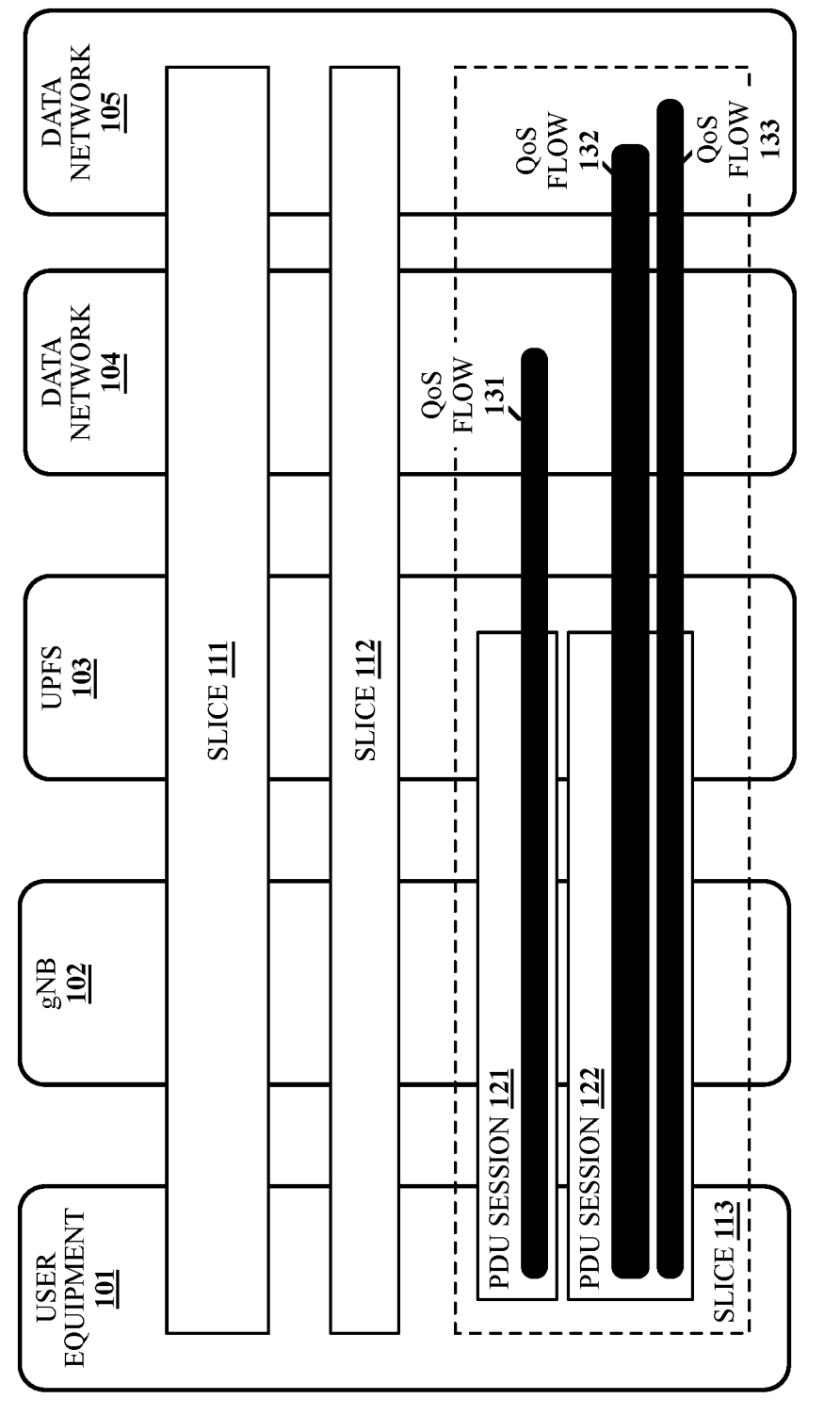
FIG. 1 illustrates an implementation for optimizing QoS flows in network slices of a 5G network.

FIG. 1 illustrates implementation 100 for optimizing QoS flows in network slices of a 5G network. Implementation 100 is an example logical hierarchy of a 5G network. Implementation 100 includes user equipment 101, gNodeB 102, UPFs 103, data network 104, and data network 105. User equipment 101 may be a wireless phone, tablet, computer, hotspot, network card, or other type of wireless system capable of wirelessly connecting to a gNodeB. GNodeB 102 is a radio access node that provides wireless connectivity for user equipment 101 to access the 5G network. UPFs 103 are network functions responsible for packet routing and forwarding between gNodeB 102 and data networks 104 and 105. Data networks 104 and 105 are data networks that provide services, such as the Internet, a voice communication service, gaming, or some other type of application service that may be supplied to user equipment 101.

In this example, the 5G network of implementation 100 is partitioned into slices 111-113. Each of slices 111-113 includes one or more PDU sessions and each PDU session includes one or more QoS flows. Slice 113, specifically, includes PDU session 121 having QoS flow 131 and PDU session 122 having QoS flow 132 and QoS flow 133. QoS flow 132 is shown to be a little thicker than QoS flow 133 to indicate that QoS flow 132 may have a greater service level requirement (e.g., greater bandwidth, lower latency, etc.) than QoS flow 133. However, different QoS flows do not necessarily have different service level requirements.

Figure 2:
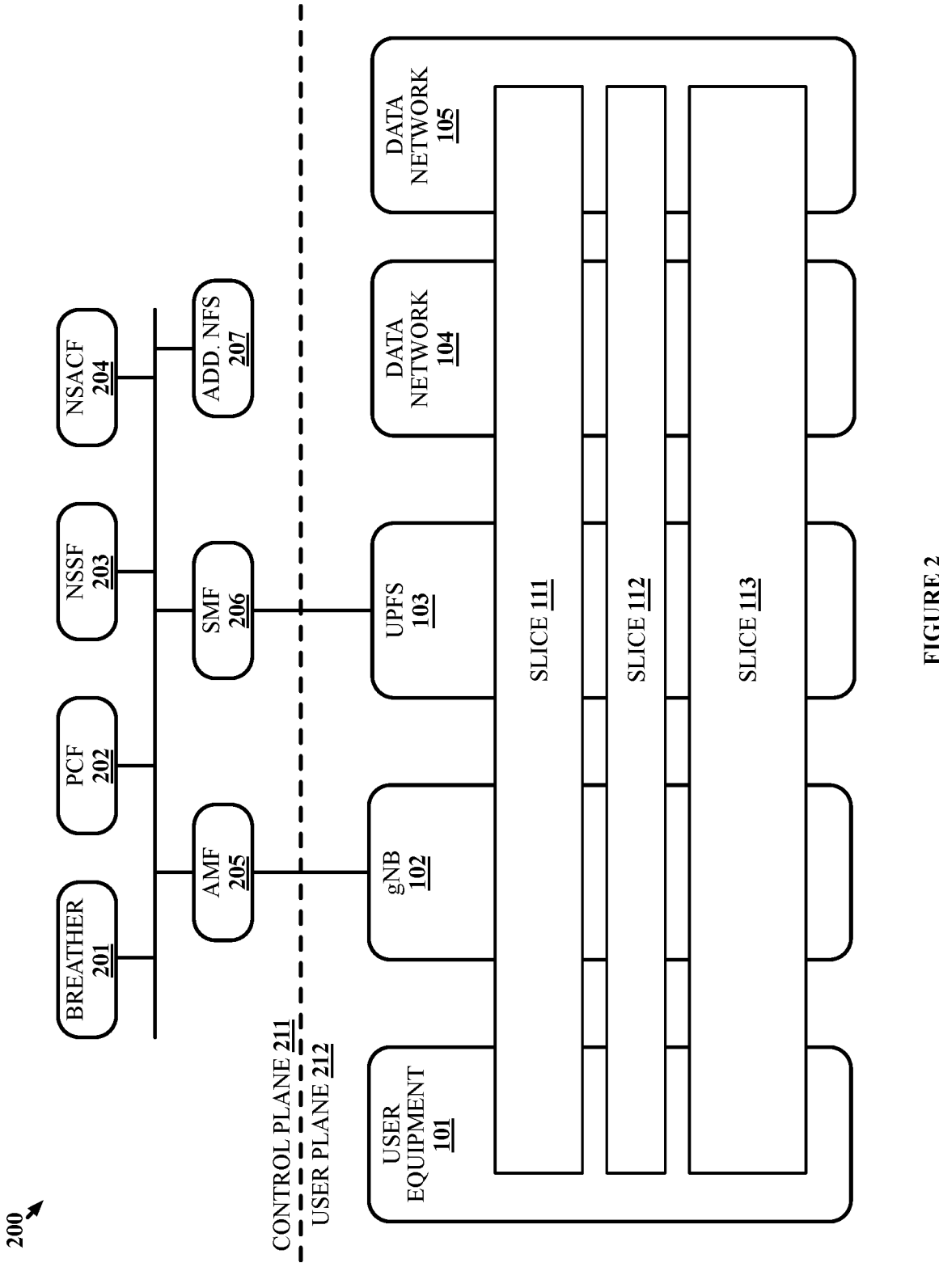
FIG. 2 illustrates an implementation for optimizing QoS flows in network slices of a 5G network.

FIG. 2 illustrates implementation 200 for optimizing QoS flows in network slices of a 5G network. Implementation 200 builds upon implementation 100 to show network functions in control plane 211 of the 5G network that control the communications occurring in user plane 212 of the 5G network in which the elements of implementation 100 are included. Slice breather 201 is a network function that handles the slice/flow optimization described herein. The network functions further include Policy Control Function (PCF) 202, Network Slice Selection Function (NSSF) 203, Network Slice Admission Control Function (NSACF) 204, Access and Mobility Management Function (AMF) 205, Session Management Function (SMF) 206, and may include one or more additional network functions (NFS) 207. Network functions 202-206 are common functions within a 5G network. Additional network functions 207 may include additional ones of network functions 202-206 that share the load with network functions 202-206. While slice breather 201 is shown as a separate function, portions of the functionality described for slice breather 201 may be included in, or distributed across, one or more of network functions 202-207. In some examples, slice breather 201 may be part of a network slice controller for the 5G network. Functions 201-207 are implemented in one or more network connected computing systems.

Figure 3:
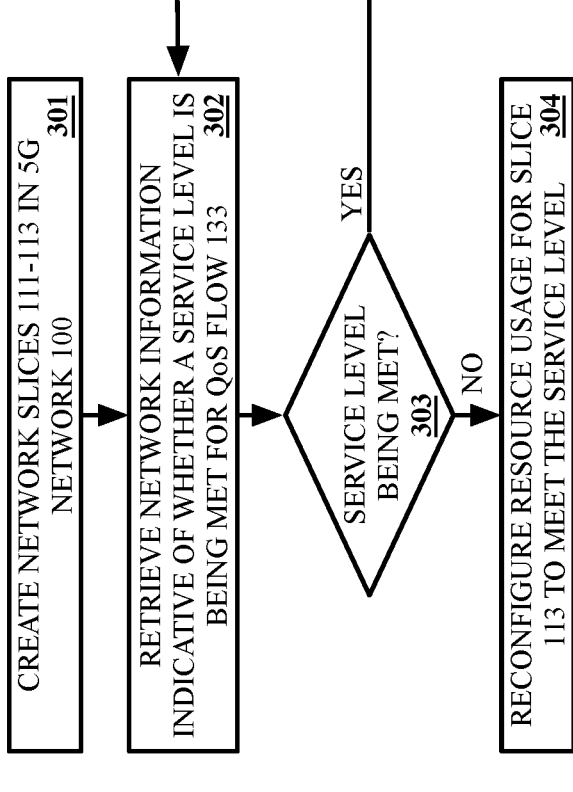
FIG. 3 illustrates an operation to optimize QoS flows in network slices of a 5G network.

FIG. 3 illustrates operation 300 to optimize QoS flows in network slices of a 5G network. In operation 300, the 5G network creates network slices 111-113 (step 301). Slice breather 201 may create the slices or some other network slice controller may create the slices. Slices 111-113 may all be created at the same time or may be created at different times. For instance, each slice may be created when user equipment connects to the 5G network that requests the slice.

While slices 111-113 exist, slice breather 201 retrieves network information indicative of whether a service level is being met for a Quality-of-Service (QOS) flow of a slice of the network slices (step 302). Slice breather 201 may focus on an individual QoS flow, such as QoS flow 131, or may perform operation 300 with respect to all QoS flows to better ensure they are all achieving their service level requirements. The information is retrieved from one or more of network functions 202-207. The information may include an indication from AMF 205 of the number of user equipment 101 registered in each of slices 111-113, an indication from SMF 206 of the number of PDU sessions in each of slices 111-113, an indication from UPFs 103 of the number of QoS flow in each of slices 111-113, and user equipment identifiers for user equipment 101. At least a portion of the aforementioned information may also be retrieved from NSACF 204 as a centralized entity that may collect the information.

The information may further include throughput and delay measurements, such as slice-wide average, standard deviation, and a specified percentile of throughput on both downlink and uplink over the measurement period, slice-wide average, standard deviation, and a specified percentile of one-way and round-trip delay on both downlink and uplink over the measurement period, for each specific user equipment 101, average, standard deviation, and a specified percentile of throughput on both downlink and uplink over the measurement period, and, for each specific user equipment 101, average, standard deviation, and a specified percentile of one-way and round-trip delay on both downlink and uplink over the measurement period. The measurement period for the statistics above may be configurable based on results. The statistics may be provided by, or based on measurements from, UPFs 103 or an application function. One-way delay may be measured between UPFs 103/application function to the gNodeB 102 in each direction (i.e., downlink and uplink). Round-trip delay may be measured by either UPFs 103 or the application function using packet markers to associate the response with the sent packet. In some networks or situations, UPFs 103 and/or application functions may not expose an interface to directly query for and retrieve the desired statistics. Rather, they may report into an operation, administration, and maintenance (OAM) module which can in turn be the source of the information.

The information may also include radio resource and performance measurements for each PDU session in a slice, such as average of Channel Quality Indicator (CQI) and corresponding data rate computed using Modulation and Coding Scheme for each of user equipment 101, slice-wide distribution of Physical Radio Blocks (PRBs) on both downlink and uplink over the measurement period, and slice-wide distribution of Modulation and Coding Scheme (MCS) on both downlink and uplink over the measurement period. The above information may be received from, or based on information provided by, gNodeB 102 or an OAM module. In some networks or situations, like the statistics above, gNodeB 102 may not expose an interface to directly query for and retrieve the desired statistics. Rather, gNodeB 102 may report into an OAM module which can in turn be the source.

Based on the retrieved information, slice breather 201 determines whether the service level is being met for the QoS flows (step 303). A service level may be defined by an SLA that an equipment operator has with the provider of the 5G network, may be based on the type of slice (e.g., for emergency services, web browsing, gaming, etc.), or may be based on some other factor. The service level may indicate a maximum latency requirement, a minimum bandwidth requirement, or some other parameter indicative of the quality of service expected for the flow. In some examples, an event may trigger when slice breather 201 determines whether a service level is being met. The event may be anything that may occur in the network that may affect the service level of a QoS flow. For example, the event could be new user equipment connecting to the network, a new session request from user equipment 101, or a measurement in the information above breaching a threshold. The event could also be the result of a decision previously made by slice breather 201, such as an admitted/denied request by user equipment 101, modification of a PDU session or QoS flow, a PDU session being released by user equipment 101, a call or session dropped or interrupted, load on, or loss of, a UPFs 103, or an error in gNodeB 102.

If all QoS flows are meeting their service level requirements, the slice breather 201 returns to step 302 to continue gathering updated information. For each QoS flow that is not meeting their service level requirements, as indicated by the information, slice breather 201 directs relevant ones of network functions 202-207 to reconfigure resources used by the slice of the QoS flow to achieve the service level requirement (step 304). The reconfiguration may include directing AMF 205 to change configuration of a wireless link between user equipment 101 and gNodeB 102. For example, gNodeB 102 may be directed to use a different radio channel or a different gNodeB if one is available to better achieve service level requirements. In some examples, SMF 206 may be directed to switch a QoS flow to a different path (e.g., a different one of UPFs 103). In some examples, rather than directing the AMF or SMF directly, slice breather 201 may provide instructions to PCF 202. PCF 202 may be involved in all decisions regarding new sessions and flows to indicate whether the sessions/flows comply with rules and policies managed by PCF 202. Thus, slice breather 201 directing PCF 202 (e.g., using an application programming interface (API) of PCF 202) can indirectly control slice resources due to the control capabilities of PCF 202. PCF 202 may fully comply with direction from slice breather 201 or PCF 202 may use the direction from slice breather 201 as a suggestion for how to reconfigure resources. For instance, PCF 202 may change throughput for a QoS flow (e.g., by communicating with AMF 205 and/or SMF 206) an amount less than the amount requested by slice breather 201. If that lesser amount does not satisfy the change in service level intended by slice breather 201, slice breather 201 may continue to request greater change and PCF 202 may change the throughput more in accordance with the continued request. In some cases, the reconfiguration may affect other QoS flows or slices. For instance, the radio channel to which a user equipment 101 may be directed to switch may be used by another user equipment that will need to be reassigned to a different radio channel as well. Other manners of reconfiguring the network are discussed below.

Figure 4:
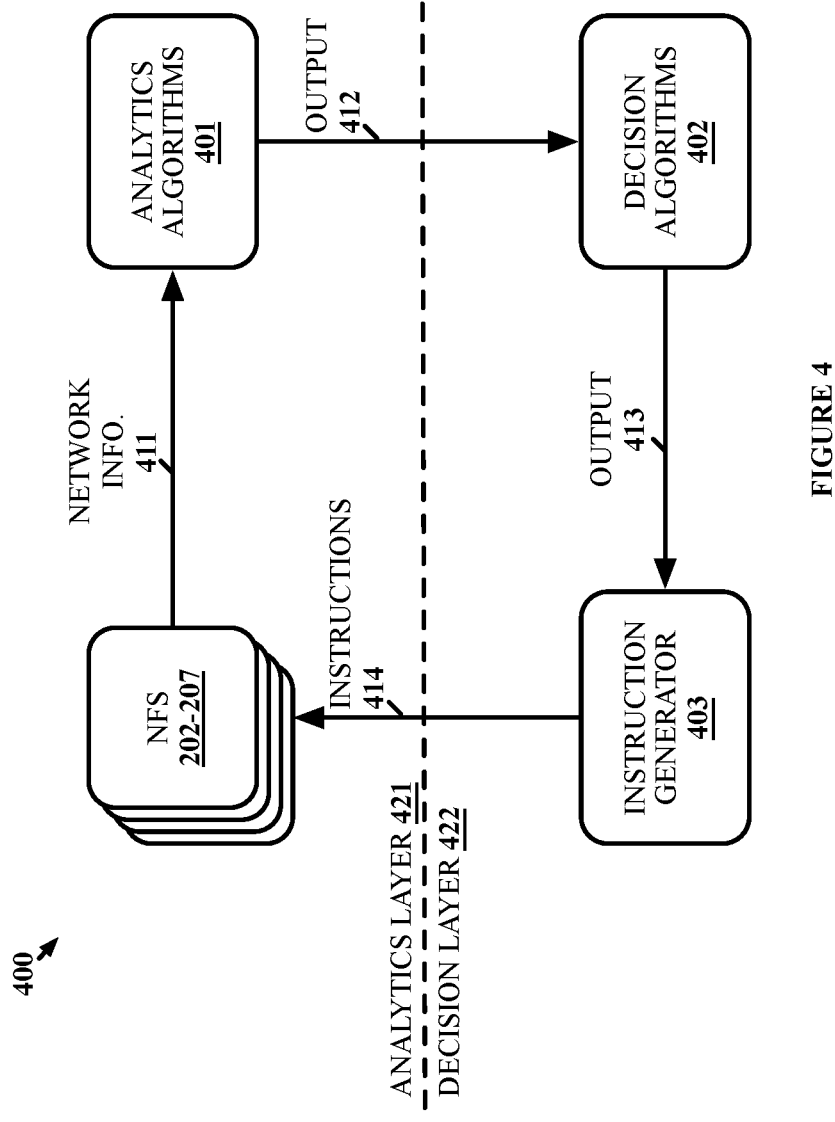
FIG. 4 illustrates a control loop for optimizing QoS flows in network slices of a 5G network.

FIG. 4 illustrates control loop 400 for optimizing QoS flows in network slices of a 5G network. Control loop 400 is an example of logic that may be used by slice breather 201 to perform slice breathing in operation 300. In control loop 400, analytics algorithms 401 receives network information 411 from network functions 202-207. This is part of analytics layer 421 used by slice breather 201. Network information 411 includes information indicating the measurements and events discussed above. Analytics algorithms 401 analyze network information 411 to determine network capacity (e.g., amount of bandwidth) consumed by the various QoS flows, PDU sessions, and slices. Analytics output 412 from analytics algorithms 401 indicates the capacity determinations. The capacity determinations may include, for all sessions that exceed their service level requirements, their individual average data rates and/or session latency metrics and, for all sessions that underperform their service level requirements, their individual average data rates and/or session latency metrics.

Decision algorithms 402 in decision layer 422 receive analytics output 412 to predict how different control actions in the 5G network may affect the 5G network. For instance, decision algorithms 402 may predict whether a control action will cause an underperforming session to meet its service level requirements and how that control action affects other sessions (e.g., will it cause a different session to begin underperforming). Once one or more predicted control actions are identified by decision algorithms 402 for implementation, the control actions are passed in decision output 413 to instruction generator 403. Instruction generator 403 generates instructions 414 for network functions 202-207 to implement the control instructions and passes instructions 414 to network functions 202-207. As noted above, instructions 414 may only instruct PCF 202 but may instruct others of network functions 202-207 directly. Control loop 400 then repeats with network information 411 again being received by analytics algorithms 401 after network functions 202-207 have complied with instructions 414. This next iteration of control loop 400 enables decision algorithms 402 to continue ensuring service levels are being met after instructions 414 are implemented. Continued iteration through control loop 400 provides feedback about the effects of decisions on the network and enables slice breather 201 to continually make adjustments.

Figure 5:
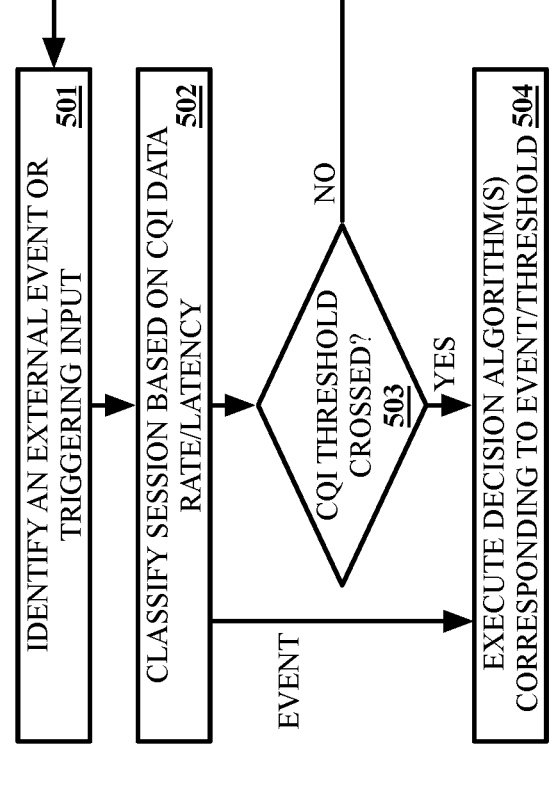
FIG. 5 illustrates an operation to optimize QoS flows in network slices of a 5G network.

FIG. 5 illustrates operation 500 to optimize QoS flows in network slices of a 5G network. Operation 500 is an example top-level decision algorithm that may be included in decision algorithms 402. In operation 500, slice breather 201 identifies an external event or other triggering input (e.g., input from analytics algorithms 401) from decision algorithms 402 (step 501). An external even is an event that occurs outside of the currently established QoS flows, PDU sessions, and slices for the 5G network. For example, the event may be a request from user equipment 101 to establish a new QoS flow or PDU session. Inputs from analytics algorithms 401 (e.g., analytics output 412) that indicates an established QoS flow, PDU session, or slice may need adjustment from decision algorithms 402. In response to identifying the event or input, slice breather 201 classifies ongoing PDU sessions and QoS flows based on CQI data rate or CQI latency (step 502).

When performing the classification, indicators of both downlink and uplink quality may be required since radio channels are different between uplink and downlink. During classification it may be particularly important to identify sessions that simply cannot reach SLA satisfaction due to radio conditions that impose a fundamental limit on service level regardless of the amount of radio resources assigned (i.e., the radio connection may be too poor).

CQI data rate is a radio link quality indicator for data rate. All of user equipment 101 return a downlink CQI, while gNodeB 102 measures uplink channel quality. Both indicators are measured at the time scale of radio frames (typically 1 ms or less) and are translated by gNodeB 102 into the corresponding maximum possible data rate. This information is averaged over a larger time scale (potentially 100s of milliseconds or even a few seconds) and made available to radio access network (RAN) OAM. This provides a time series (per user equipment 101) of radio channel quality at the time scales used by decision algorithms 402, enabling good quality trend analysis and predictions. In the event the uplink CQI is not available, the downlink CQI may be used as an indicator of uplink channel quality due to the long averaging period.

CQI latency is a radio link quality indicator for latency. While the CQI is a direct indicator of the maximum possible data rate, there is no such indicator available for the minimum latency achievable. Thus, slice breather 201 uses the notion of "CQI latency." Slice breather 201 may compute CQI latency by estimating CQI latency from the CQI data rate. To do so, slice breather 201 may compute the minimum time taken to successfully transmit a typical application message as the ratio of the message size and the CQI indicated maximum data rate. If the SLA provides a typical message size, the size can be used. If not, slice breather 201 may assume from a knowledge of applications or computed from observations of all user equipment with similar SLAs. Slice breather 201 may also estimate CQI latency from observations of those of user equipment 101 with similar CQI. Slice breather 201 obtains experienced latencies for all of user equipment 101 with a similar CQI, computes a distribution, extracts, e.g., the 90-th percentile value from that distribution, and uses the extracted percentile as the achievable latency for this one of user equipment 101.

There are three potential classifications in this example that slice breather 201 may use at step 502. Other examples may use different classifications. In this example, a session may be classified as unachievable, needs uplift, or top heavy. With respect to CQI data rate unachievable sessions are sessions with a CQI data rate less than their respective SLA-defined throughput. The sessions cannot possibly be served with satisfactory throughput since radio conditions do not allow it. Sessions needing uplift are sessions that have a CQI data rate exceeding their respective SLA-defined throughput but with a measured throughput less than the respective SLA-defined throughput. Top heavy sessions are sessions with both CQI data rate and measured throughput exceeding their respective SLA throughput.

With respect to CQI latency, unachievable sessions are sessions with CQI latency exceeding their respective SLA-defined latency. The sessions cannot possibly be served with satisfactorily low latency since radio conditions do not allow it. Sessions needing uplift are sessions with CQI latency less than their respective SLA-defined latency but with a measured latency metric exceeding the SLA latency. Top heavy sessions are sessions with CQI latency and measured latency metric less than their respective SLA latency.

If an external event was identified, slice breather 201 skips to step 504. Otherwise, slice breather 201 determines whether the input received from decision algorithms 402 crossed a threshold value (step 503). The thresholds may be provided by predefined parameters provided to govern the operation of slice breather 201. For example, analytics output 412 from analytics algorithms 401 may predict a performance of a session and that performance may cross a threshold level of performance that warrants slice breather 201 using decision algorithms 402 to adjust the sessions to change that predicted performance. Specifically, slice breather 201 selects one of decision algorithms 402 that is relevant to the particular event identified or the particular input that crossed the threshold (step 504).

Decision algorithms 402 may include an admission control algorithm that determines whether an external event, such as a new user equipment, PDU session, or QoS flow, should be admitted or rejected. Decision algorithms 402 may also include a session path placement algorithm that determines a path for an external event like those listed above or determines a new path for a current session based on performance of the current session relative to its service level requirements. A slice aggregate control algorithm may also be included in decision algorithms 402. A slice aggregate control algorithm determines whether service levels of a slice as a whole cross a threshold and, if so, adjusts aggregate slice parameters such as data rate, average or percentile latency, and resources consumed. Session throughput balancing is another algorithm that may be included in decision algorithms 402 and adjusts the throughput of identified sessions. An identified session may be a session identified due to its performance crossing a threshold or may be arrival of a new user equipment, setup of new PDU session or QoS flow. Slice aggregate control may occur subsequently to (or subsumed in) admission control and session placement algorithms. Decision algorithms 402 may also include a session latency balancing algorithm. Latency balancing may be higher priority than throughput balancing for sessions identified as requiring both. The sessions needing latency balancing (i.e., adjustment of latencies in specific sessions) may be new sessions and those with performance crossing a threshold like is the case for session throughput balancing. Decision algorithms 402 may also include a cross-slice balancing algorithm that adjusts aggregate slice parameters, such as data rate and resources consumed, for identified sessions. The identified sessions are those identified based on slice-level performance crossing a threshold or RAN uplink congestion.

Figure 6:
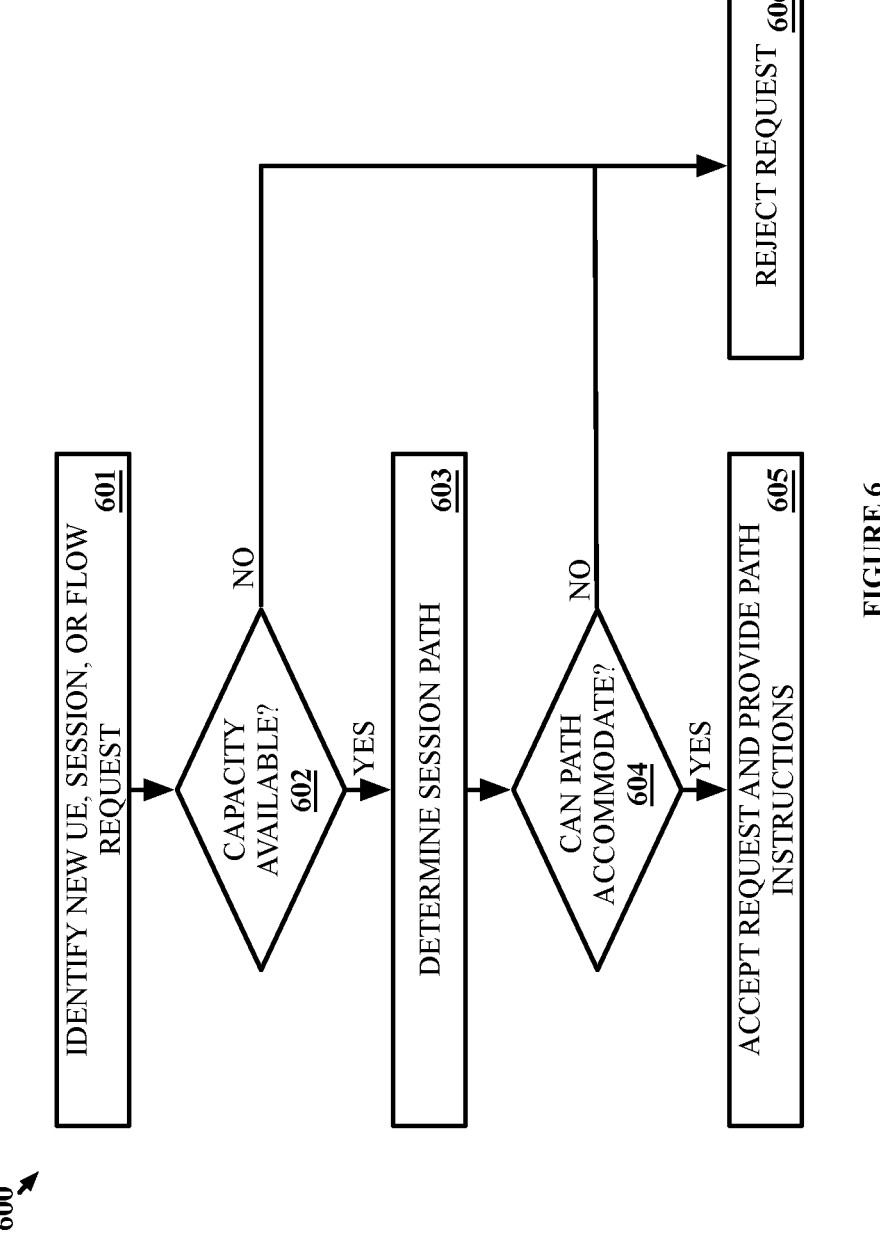
FIG. 6 illustrates an operation to optimize QoS flows in network slices of a 5G network.

FIG. 6 illustrates an operation 600 to optimize QoS flows in network slices of a 5G network. Operation 600 is an example of an admission control algorithm in decision algorithms 402 used by slice breather 201. In the 5G network, AMF 205 controls access to the radio link with gNodeB 102, and SMF 206 then sets up sessions. When slices are involved, a session or flow from a user equipment 101 that requests access to a slice can only be admitted only if the radio channel in gNodeB 102 has adequate capacity, the slice itself has adequate capacity, and the path through gNodeB 102 also has adequate capacity. Thus, operation 600 is performed to make those determinations.

In operation 600, slice breather 201 identifies a request for a new user equipment 101 to access a slice or a request from an existing user equipment 101 to setup a new PDU session or QoS flow (step 601). For a new user equipment 101, AMF 205 performs its usual (5G specified) function of assessing whether to admit into the network. Slice breather 201 evaluates whether the request's service level requirements can be met by the available slice capacity, or a predicted capacity calculated by analytics algorithms 401 (step 602). If predicted capacity is available, the predicted capacity is used instead as it is likely a better measure of the future conditions to be experienced by the new request. If slice breather 201 determines that not enough capacity exists, then slice breather 201 directs AMF 205 (either directly or via a recommendation to PCF 202) to reject the request (step 606). In some examples, rather than rejecting the request immediately, slice breather 201 may use a session rebalancing algorithm to determine whether resources can be adjusted to create capacity on the slice to accommodate the request.

If slice breather 201 determines that capacity is available, slice breather 201 performs session path placement to find a path that can accommodate the request (step 603). If no path is found, slice breather 201 directs AMF 205 to reject the request (step 606). If the request can be accommodated on a path, slice breather 201 notifies the relevant network functions 202-207 about acceptance of the request and which path has been identified (step 605). For example, slice breather 201 may reconcile the decision with policies indicated in PCF 202 and NSACF 204 before directing AMF 205 and SMF 206 to initiate procedures to setup the requested session or may rely on PCF 202 to control AMF 205 and SMF 206 in accordance with the determinations of slice breather 201.

Figure 7:
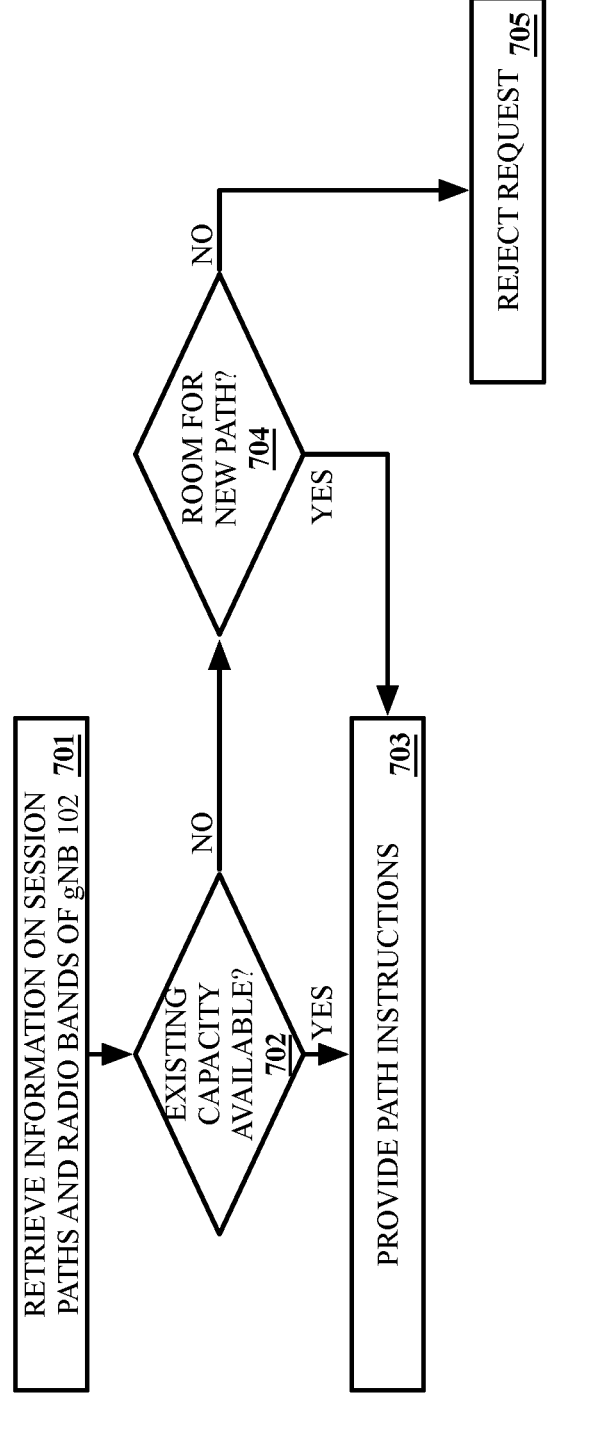
FIG. 7 illustrates an operation to optimize QoS flows in network slices of a 5G network.

FIG. 7 illustrates operation 700 to optimize QoS flows in network slices of a 5G network. Operation 700 is an example session path placement algorithm in decision algorithms 402 used by slice breather 201. Operation 700 is mainly invoked by slice breather 201 when a new session or QoS flow request is accepted during operation 600 at step 603. As such, operation 700 may be a specific algorithm used for step 604 of operation 600.

Once operation 700 is invoked, slice breather 201 retrieves information about session paths and radio bands of gNodeB 102 to which user equipment 101 connects (step 701). The information retrieved may include indications of all network paths that include gNodeB 102 as well as the associated capacities of those paths, all radio bands within gNodeB 102 that are operational and serving the slice, and any radio bands that can be supported by gNodeB 102 but are not operational.

Based on the information, slice breather 201 determines whether there are one or more of the paths with capacity to accommodate the request (step 702). If at least one of the paths is determined to have the capacity, slice breather 201 selects one of the determined paths. The path may be selected using load balancing considerations among the determined paths. Slice breather 201 may select the path having the most available capacity, may use round robin for path selection, may use a weighted choice rule, may select a path at random, or may use some other selection convention. Once selected, slice breather 201 notifies the relevant network functions 202-207 about the path so that the requested session or QoS flow can be setup on the selected path (step 703). For example, slice breather 201 may reconcile the path decision with policies indicated in PCF 202 before directing AMF 205, SMF 206, and UPFs 103 to initiate procedures to setup the requested session on the selected path.

If slice breather 201 cannot identify a path having adequate capacity, slice breather 201 may reject the request by proceeding directly to step 705. However, in this example, slice breather 201 determines whether it would be possible to instantiate a new radio band that is supported by gNodeB 102 and user equipment 101 but is not operational. For instance, a channel may not be in use due to energy saving requirements. If such a channel exists, slice breather 201 add a new path including the channel to the path list. Slice breather 201 then notifies the relevant network functions 202-207 about the new path so that the requested session or QoS flow can be setup on the path (step 703). If a new path cannot be instantiated, slice breather 201 rejects the request and informs the relevant ones of network functions 202-207 (step 705).

Figure 8:
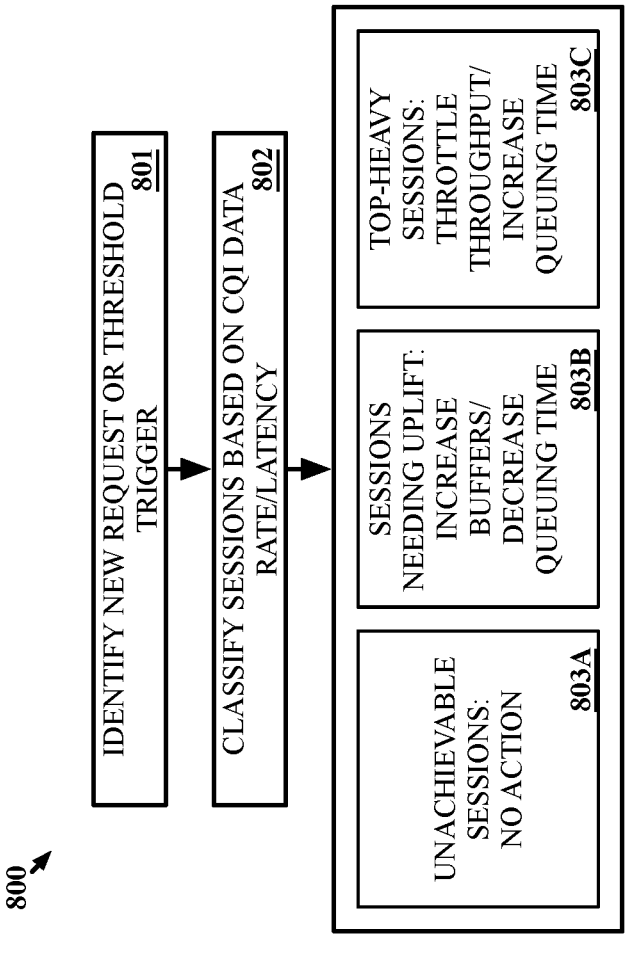
FIG. 8 illustrates an operation to optimize QoS flows in network slices of a 5G network.

FIG. 8 illustrates operation 800 to optimize QoS flows in network slices of a 5G network. Operation 800 is an example session control algorithm for throughput and/or latency balancing. In operation 800, slice breather 201 identifies a triggering event, such as a new request or threshold crossing, as discussed above (step 801). In some examples, operation 800 may be performed between steps 704 and 705 of operation 700 in an attempt to free up capacity on a path when slice breather 201 determined that no path currently had adequate capacity available. Slice breather 201 also classifies sessions based on CQI data rate and CQI latency if the sessions have not already been classified (step 802). The sessions classified into unachievable, needs uplift, and top heavy for each of CQI data rate and CQI latency (or only one of the two if only one classification will be considered).

Based on each session's CQI data rate classification, slice breather 201 determines whether an adjustment can be performed to free up resources on other sessions (step 803). One algorithm that may be used by slice breather 201 is Weighted Fair Scheduling (WFS) which is also commonly implemented on IP routers including UPFs. While other algorithms may also be used, WFS is well suited due to its amenability to flows and applies control actions to each session in commensuration with its degree of over- or under-performance. A result of applying WFS is to gradually increase/decrease queuing buffers as well as scheduling frequency of flows so that network protocols do not get overwhelmed. For session categorized as unachievable, slice breather 201 takes no action since unachievable sessions have radio conditions that cause issues that cannot be overcome (step 803A). For sessions needing uplift, slice breather 201 may increase queuing buffer sizes (and priority if needed) of the sessions (step 803B). For top-heavy sessions, slice breather 201 may decrease queuing buffer sizes (and priority if needed) of all the sessions or specific sessions (e.g., only enough of the top-heavy sessions that are needed to attain enough capacity on a path) (step 803C).

Similarly, based on each session's CQI latency classification, slice breather 201 also determines whether an adjustment can be performed to free up resources on other sessions (step 803). WFS may also be used with respect to CQI latency, but other algorithms may also be used. No action is taken for sessions classified as unachievable (step 803A). For sessions classified as needing uplift, slice breather 201 may decrease queuing times (and increase priority if needed) of sessions (step 803B). For sessions classified as top heavy, slice breather 201 may increase queuing times (and decrease priority if needed) of all of the sessions or specific sessions (step 803C).

To implement the determinations of step 803, slice breather 201 may communicate with PCF 202 to reconcile the determinations with policies in place and may communicate with SMF 206 and UPFs 103 to enforce latency controls and queuing changes.

Slice breather 201 may also invoke an algorithm for slice aggregate control to ensure that aggregate level requirements in slice service level requirements are not exceeded during operations to the detriment of other slices. For instance, the slice template may provide a "Downlink throughput per network slice" (aggregated downlink data rate for all UEs in the slice) attribute as well as an "Uplink throughput per network slice" (aggregated uplink data rate for all UEs in the slice) with a value of 100 Mbps or specify that 90% of the sessions should experience a latency of less than 50 ms. If a slice exceeds these performance metrics while another slice is underperforming, slice aggregate control can be applied to correct the imbalance.

To perform slice aggregate control, slice breather 201 may limit the top-heavy sessions. Applying controls to all sessions uniformly instead may move the slice aggregate parameter towards the desired target but may also result in the other sessions being adversely affected. If the slice service level requirements specify both latency and throughput, latency takes precedence when performing slice aggregate control. The controls to be applied to these sessions are flow throttling when throughput control is desired and increased queuing times when latency control is desired. Slice breather 201 applies the appropriate controls to the "Top heavy" sessions; the magnitude of throttling or queuing time increase should be relatively small so that network protocols do not get overwhelmed.

FIG. 9 illustrates a computing system 900 that is representative of any system or collection of systems in which the various processes, systems, programs, services, and scenarios disclosed herein may be implemented. Examples of computing system 900 include, but are not limited to, desktop computers, laptop computers, server computers, routers, web servers, cloud computing platforms, and data center equipment, distributed computing systems, as well as any other type of physical or virtual server machine, physical or virtual router, container, and any variation or combination thereof. It should be understood virtualized components are executing on physical hardware like that of computing system 900.

Computing system 900 may be implemented as a single apparatus, system, or device or may be implemented in a distributed manner as multiple apparatuses, systems, or devices. Computing system 900 may include, but is not limited to, processing system 915, storage system 905, software 925, communication interface system 910, and user interface system 920. Processing system 915 may be operatively coupled with storage system 905, communication interface system 910, and user interface system 920.

Processing system 915 may load and execute software 925 from storage system 905. Software 925 may include and implement breather process 930, which may be representative of any of the operations for optimizing flow performance in network slices of a 5G network (e.g., operation 300). Accordingly, computing system 900 may be slice breather 201 or may be a host system for a virtualized example of slice breather 201. Computing system 900 may also represent computing systems for network functions 202-207—including combinations thereof. When executed by processing system 915, software 925 may direct processing system 915 to operate as described herein for at least the various processes, operational scenarios, and sequences discussed in the foregoing implementations. Computing system 900 may optionally include additional devices, features, or functionality not discussed for purposes of brevity.

In some embodiments, processing system 915 may comprise a micro-processor and other circuitry that retrieves and executes software 925 from storage system 905. Processing system 915 may be implemented within a single processing device but may also be distributed across multiple processing devices or sub-systems that cooperate in executing program instructions. Examples of processing system 915 may include general purpose central processing units, graphical processing units, application specific processors, and logic devices, as well as any other type of processing device, combinations, or variations thereof.

Storage system 905 may comprise any memory device or computer readable storage media readable by processing system 915 and capable of storing software 925. Storage system 905 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a transitory form of signal transmission (often referred to as "signals per se"), such as a propagating electrical or electromagnetic signal or carrier wave.

In addition to computer readable storage media, in some implementations storage system 905 may also include computer readable communication media over which at least some of software 925 may be communicated internally or externally. Storage system 905 may be implemented as a single storage device but may also be implemented across multiple storage devices or sub-systems co-located or distributed relative to each other. Storage system 905 may comprise additional elements, such as a controller, capable of communicating with processing system 915 or possibly other systems.

Software 925 (including process 930 among other functions) may be implemented in program instructions that, when executed by processing system 915, direct processing system 915 to operate as described with respect to the various operational scenarios, sequences, and processes illustrated herein. For example, software 925 may include program instructions for creating network slices in a 5G network, retrieving network information indicative of whether a service level is being met for a QoS flow of a slice of the network slices, determining the service level for the QoS flow is not being met based on the network information, and, in response to determining the service level for the QoS flow is not being met, directing network control functions of the 5G network to reconfigure resource usage for the slice to achieve the service level for the QoS flow.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 925 may include additional processes, programs, or components, such as operating system software, virtualization software, or other application software. Software 925 may also comprise firmware or some other form of machine-readable processing instructions executable by processing system 915.

In general, software 925 may, when loaded into processing system 915 and executed, transform a suitable apparatus, system, or device (of which computing system 900 is representative) overall from a general-purpose computing system into a special-purpose computing system customized to act, for example, as a slice breather or the like as described herein. Indeed, encoding software 925 on storage system 905 may transform the physical structure of storage system 905. The specific transformation of the physical structure may depend on various factors in different implementations of this description. Examples of such factors may include, but are not limited to, the technology used to implement the storage media of storage system 905 and whether the computer-storage media are characterized as primary or secondary storage, as well as other factors.

For example, if the computer readable storage media are implemented as semiconductor-based memory, software 925 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 910 may include communication connections and devices that allow for communication with other computing systems (not shown) over communication networks (not shown). Examples of communication connections and devices that together allow for inter-system communication may include network interface cards, antennas, power amplifiers, radio-frequency (RF) circuitry, transceivers, and other communication circuitry. The communication connections and devices may communicate over communication media to exchange communications with other computing systems or networks of systems, such as metal, glass, air, or any other suitable communication media.

Communication between computing system 900 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof.

As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more memory devices or computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected." "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or." in reference to a list of two or more items, covers all the following interpretations of the word: any of the items in the list, all the items in the list, and any combination of the items in the list.

The phrases "in some embodiments." "according to some embodiments." "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the only system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method for optimizing flow performance in network slices of a Fifth-Generation (5G) network, the method comprising:

creating the network slices in the 5G network, wherein the network slices comprise logically separated networks running on the 5G network;

retrieving network information indicative of whether a service level is being met for a Quality-of-Service (QOS) flow of a slice of the network slices;

determining the service level for the QoS flow is not being met based on the network information; and in response to determining the service level for the QoS flow is not being met, directing network control functions of the 5G network to reconfigure resource usage for the slice to achieve the service level for the QoS flow including classifying sessions on the slice based on at least one of data rate and latency of radio links relative to service level agreements for the sessions and adjusting at least one of buffer size and priority within the buffer for those of the sessions other than those with classifications indicating that radio link quality is limiting compliance with a service level agreement.

2. The method of claim 1, wherein retrieving the network information comprises:

receiving the network information from network functions and network elements of the 5G network servicing QoS flows for the slices.

3. The method of claim 1, wherein determining the service level for the QoS flow is not being met comprises:

inputting the network information into one or more analytics algorithms that track service level parameters for the service level and indicate whether the service level is being met.

4. The method of claim 3, wherein:

classifying the sessions on the slice comprises inputting first output of the one or more analytics algorithms into one or more decision algorithms; and second output of the one or more decision algorithms indicates configuration parameters, including the at least one of the buffer size and the priority within the buffer, that comply with the service level parameters.

5. The method of claim 1, comprising:

identifying an external event and including event information about the external event in the network information.

6. The method of claim 5, wherein the external event includes a request that increases a flow load on the slice and wherein directing the network control functions to reconfigure the resource usage comprises:

rejecting the request when the service level cannot otherwise be maintained for the QoS flow.

7. The method of claim 6, wherein the request comprises a slice-access request for user equipment not already connected to the slice.

8. The method of claim 1, wherein directing the network control functions to reconfigure the resource usage comprises:

redistributing resources reserved for those of the sessions with the classifications indicating that radio link quality is limiting compliance with a service level agreement.

9. The method of claim 1, wherein determining the service level for the QoS flow is not being met comprises:

determining a threshold has been crossed in the network information.

10. The method of claim 1, wherein the classifications include unachievable, needs uplift, or top heavy, with those of the sessions being unachievable indicates that the radio link quality is limiting compliance with the service level agreement.

11. A apparatus to optimize flow performance in network slices of a Fifth-Generation (5G) network, the apparatus comprising:

one or more computer readable storage media;

a processing system operatively coupled with the one or more computer readable storage media; and program instructions stored on the one or more computer readable storage media that, when read and executed by the processing system, direct the apparatus to:

create the network slices in the 5G network, wherein the network slices comprise logically separated networks running on the 5G network;

retrieve network information indicative of whether a service level is being met for a Quality-of-Service (QOS) flow of a slice of the network slices;

determine the service level for the QoS flow is not being met based on the network information; and in response to determining the service level for the QoS flow is not being met, direct network control functions of the 5G network to reconfigure resource usage for the slice to achieve the service level for the QoS flow including directing the apparatus to classify sessions on the slice based on at least one of data rate and latency of radio links relative to service level agreements for the sessions and redistribute resources reserved for those of the sessions with classifications indicating that radio link quality is limiting compliance with a service level agreement.

12. The apparatus of claim 11, wherein to retrieve the network information, the program instructions direct the processing system to:

receive the network information from network functions and network elements of the 5G network servicing QoS flows for the slices.

13. The apparatus of claim 11, wherein to determine the service level for the QoS flow is not being met, the program instructions direct the processing system to:

input the network information into one or more analytics algorithms that track service level parameters for the service level and indicate whether the service level is being met.

14. The apparatus of claim 13, wherein to classify the sessions on the slice, the program instructions direct the processing system to:

input first output of the one or more analytics algorithms into one or more decision algorithms;

wherein second output of the one or more decision algorithms, wherein the second output indicates configuration parameters, including the resources, to comply with the service level parameters.

15. The apparatus of claim 11, wherein the program instructions direct the processing system to:

identify an external event and including event information about the external event in the network information.

16. The apparatus of claim 15, wherein the external event includes a request that increases a flow load on the slice and wherein to direct the network control functions to reconfigure the resource usage, the program instructions direct the processing system to:

reject the request when the service level cannot otherwise be maintained for the QoS flow.

17. The apparatus of claim 16, wherein the request comprises a slice-access request for user equipment not already connected to the slice.

18. The apparatus of claim 11, wherein to direct the network control functions to reconfigure the resource usage, the program instructions direct the processing system to:

adjust at least one of buffer size and priority within the buffer for those of the sessions other than those with the classifications indicating that radio link quality is limiting compliance with a service level agreement.

19. The apparatus of claim 11, wherein to determine the service level for the QoS flow is not being met, the program instructions direct the processing system to:

determine a threshold has been crossed in the network information.

20. One or more computer readable storage media having program instructions stored thereon to optimize flow performance in network slices of a Fifth-Generation (5G) network, the program instructions, when read and executed by a processing system, direct the processing system to:

create the network slices in the 5G network, wherein the network slices comprise logically separated networks running on the 5G network;

retrieve network information indicative of whether a service level is being met for a Quality-of-Service (QOS) flow of a slice of the network slices;

determine the service level for the QoS flow is not being met based on the network information; and in response to determining the service level for the QoS flow is not being met, classify sessions on the slice based on at least one of data rate and latency of radio links relative to service level agreements for the sessions and adjust at least one of buffer size and priority within the buffer for those of the sessions other than those with classifications indicating that radio link quality is limiting compliance with a service level agreement.

\* \* \* \* \*